(12) United States Patent
Jung

(10) Patent No.: US 8,094,162 B2
(45) Date of Patent: Jan. 10, 2012

(54) METHOD AND DEVICE FOR ADJUSTING PREFERRED COLOR AND LIQUID CRYSTAL DISPLAY DEVICE WITH THE SAME

(75) Inventor: Ho Young Jung, Busan-si (KR)

(73) Assignee: LG Display Co., Ltd., Seoul (KR)

( * ) Notice: Subject to any disclaimer, the term of this patent is extended or adjusted under 35 U.S.C. 154(b) by 743 days.

(21) Appl. No.: 12/183,422

(22) Filed: Jul. 31, 2008

(65) Prior Publication Data

US 2009/0167780 A1 Jul. 2, 2009

(30) Foreign Application Priority Data

Dec. 31, 2007 (KR) .................. 10-2007-0141401

(51) Int. Cl.
*G09G 5/00* (2006.01)
*G09G 5/02* (2006.01)
*G09G 5/10* (2006.01)
*H04N 5/46* (2006.01)
*G03F 3/08* (2006.01)
*G06K 9/00* (2006.01)
*G06K 9/40* (2006.01)
*H04N 5/58* (2006.01)
*H04N 9/64* (2006.01)

(52) U.S. Cl. ........ 345/581; 345/593; 345/690; 345/619; 345/204; 348/256; 348/557; 348/603; 358/518; 358/519; 382/162; 382/167; 382/254; 382/274

(58) Field of Classification Search .................. 345/428, 345/581–593, 600, 617–619, 549, 204, 690, 345/22, 77, 88; 348/253–256, 557, 603, 348/630, 645, 671, 761; 358/518–519; 382/162–167, 254, 274, 276, 305
See application file for complete search history.

(56) References Cited

U.S. PATENT DOCUMENTS

| | | | |
|---|---|---|---|
| 5,986,718 A * | 11/1999 | Barwacz et al. ............. 348/592 |
| 2005/0206927 A1* | 9/2005 | Yamada ....................... 358/1.9 |
| 2006/0203298 A1* | 9/2006 | Kuwata et al. ............... 358/448 |
| 2007/0252782 A1* | 11/2007 | Yui .............................. 345/58 |
| 2008/0064922 A1* | 3/2008 | Uchida et al. ................ 600/109 |

* cited by examiner

*Primary Examiner* — Wesner Sajous
(74) *Attorney, Agent, or Firm* — Brinks Hofer Gilson & Lione

(57) ABSTRACT

Method and device are disclosed for adjusting a preferred color which enables a user to set a preferred color conveniently and a liquid crystal display device with the same. The method and device for adjusting a preferred color includes displaying a menu selection image and setting a variety of optional information, making successive display of at least one selection image which shows a plurality of selection images having information on preferred colors different from one another to set information on the preferred colors in succession, and storing the information on the preferred colors set and generating an image having preferred colors adjusted according to the information on the preferred colors stored.

10 Claims, 6 Drawing Sheets

METHOD AND DEVICE FOR ADJUSTING PREFERRED COLOR AND LIQUID CRYSTAL DISPLAY DEVICE WITH THE SAME

This application claims the benefit of the Patent Korean Application No. 10-2007-0141401, filed on Dec. 31, 2007, which is hereby incorporated by reference as if fully set forth herein.

BACKGROUND OF THE INVENTION

1. Field of the Invention

The present invention relates to method and device for adjusting a preferred color, more particularly, to method and device for adjusting a preferred color which enables a user to set a preferred color conveniently, and a liquid crystal display device with the same.

2. Discussion of the Related Art

Related art image display devices used in TVs, personal computers, printers, scanners, notebook computers, and so on have made one-sided provision of preset colors to the user regardless of a user's preference of the colors. Consequently, the user can only use the colors provided, even if the color on the image display device is not satisfactory, or is required to display an image with the image display device that provides the color of the user's taste.

Recently, the image display device are being developed with higher resolution and higher definition according to user demands. In this instance, most users determine the definition of the image with reference to a preferred color which is displayed on the image display device, such as skin color, a green color, a blue color, a red color, and so on. This is because the preferred color, stored in a color memory space of a brain, highly influences the a color recognizing process. Therefore, designers of the image display device intend to display a clear image with reference to the preferred color the user requires.

However, users who have no expert knowledge on the color have difficulty in adjusting ratios of the preferred colors, and feel inconvenienced in adjusting the preferred color. Thus, it is difficult for the user to display a clear image by using the preferred color. In other words, because most users do not know the preferred color well, and, in most of cases, have difficulty in adjusting ratios of colors of red, green, and blue the users leave preset colors as they are.

Referring to FIG. 1, in the related art image display device, the user is required to vary the ratio of the red, green, and blue colors numerically by using a color adjusting text. Along with this, the user is required to vary overall brightness, color saturation, and luminance of the image by using the color adjusting text. However, in a case the user makes numerical color ratio adjustment by using the color adjusting text, satisfaction of the user is poor because the user's numerical color ratio adjustment is not intuitive. Moreover, since the user has no idea on an amount of variation of the numerical value, the user's inconvenience increases.

SUMMARY OF THE INVENTION

A method for adjusting a preferred color includes a menu selection and setting step for displaying a menu selection image and setting a variety of optional information, a preferred color selection step for making successive display of at least one selection image which shows a plurality of selection images having information on preferred colors different from one another to set information on the preferred colors in succession, and a preferred color information storing step for storing the information on the preferred colors set and generating an image having preferred colors adjusted according to the information on the preferred colors stored.

In one preferred embodiment, the at least one selection image is an image showing a plurality of selection images having brightness or color saturation set different from one another in similar colors so that one of preferred colors can be selected from each of a skin color, a red color, a green color, a blue color, a sunset color, and a brown color.

In another aspect of the present invention, a device for adjusting a preferred color includes a preferred color information storing unit for storing information on preferred colors, and a preferred color adjusting unit for adjusting images received from an outside of the device in succession according to the information on preferred colors stored thus to forward images each having preferred colors adjusted.

In a preferred embodiment, the at least one selection image is an image showing a plurality of selection images having brightness or color saturation set different from one another in similar colors so that one of preferred colors can be selected from each of a skin color, a red color, a green color, a blue color, a sunset color, and a brown color.

The at least one selection image further includes an image showing a plurality of selection images having contrasts set different from one another, and an image showing a plurality of selection images having information on gammas set different from one another.

In another aspect of the present invention, a liquid crystal display device includes a liquid crystal display panel having a plurality of pixels for displaying an image, a panel driving unit for driving the liquid crystal display panel, a preferred color adjusting device as claimed in one of claims 6 to 9 for generating an image having preferred colors adjusted according to preferred color information the user sets, and a timing controller for aligning images each having preferred colors adjusted suitable for driving the liquid crystal display panel, and controlling the panel driving unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
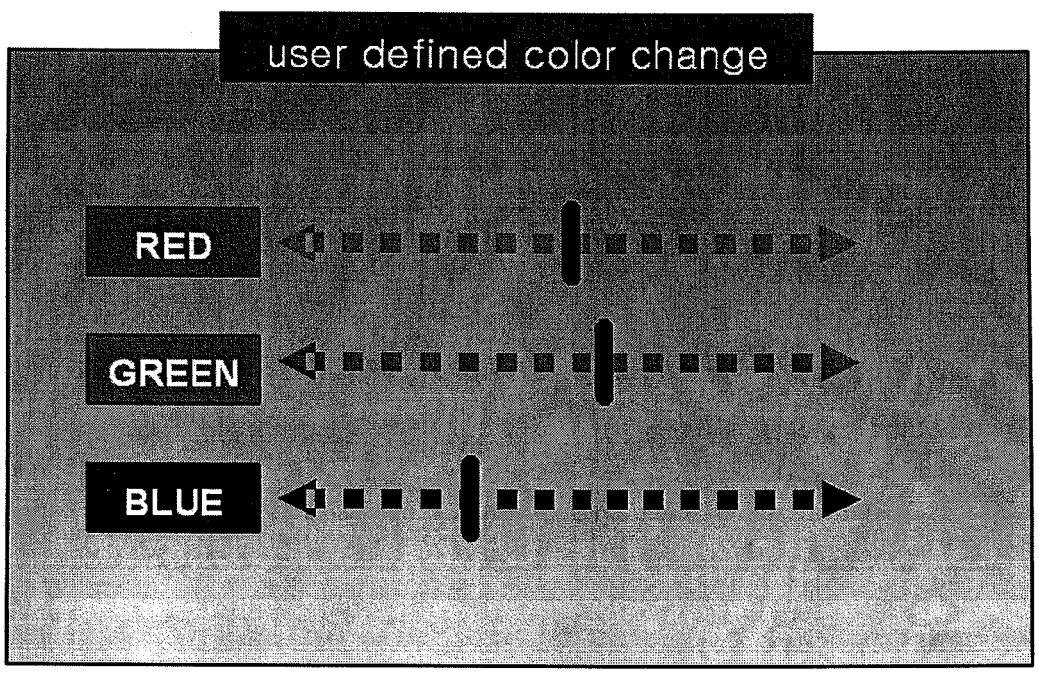
FIG. 1 is a color adjusting text for varying color ratios in the related art.
Figure 2:
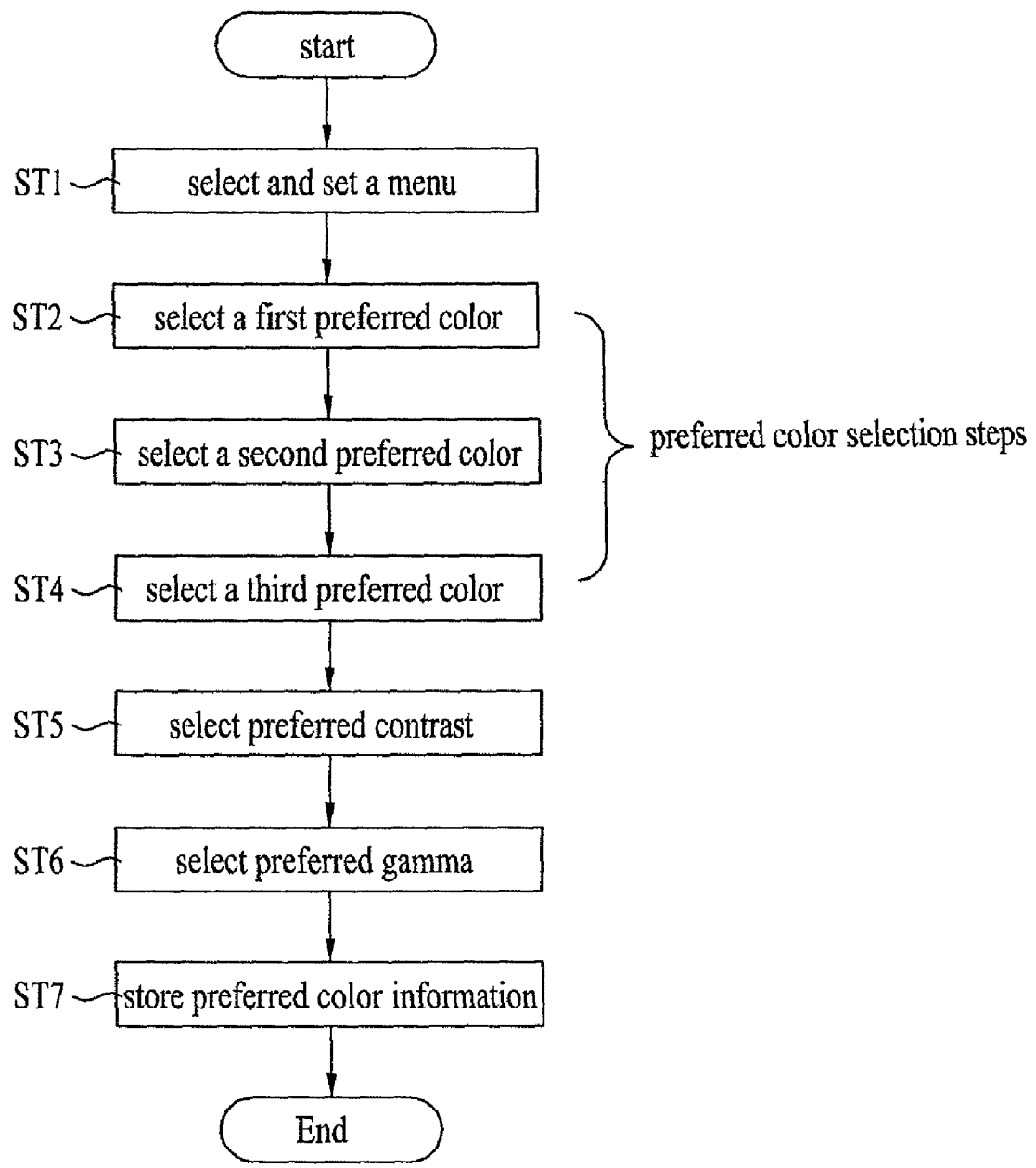
FIG. 2 is a flow chart illustrating the steps of a method for adjusting preferred colors in accordance with a preferred embodiment of the present invention.

FIG. 2 is a flow chart illustrating the steps of a method for adjusting preferred colors in accordance with a preferred embodiment of the present invention.

Referring to FIG. 2, the method for adjusting a preferred color includes a menu selection and setting step (ST1) for displaying a menu image and setting a variety of optional information, a preferred color selection step (ST2~ST4) for displaying at least one preferred color selection image which shows a plurality of selection images having information on preferred colors different from one another on a screen in succession to set preferred color information in succession, and a preferred color information storing step (ST7) for storing the information on the preferred colors set, and generating a preferred color adjusting image according to the information on the preferred colors stored.

Referring to FIG. 2, the method for adjusting a preferred color further includes a contrast selection step (ST5) for displaying a contrast selection image which shows a plurality of selection images having information on contrasts different from one another on one screen to set information on preferred colors with reference to the contrast, and a gamma selection step (ST6) for displaying a gamma selection image which shows a plurality of selection images having information on gammas different from one another on one screen to set information on preferred colors with reference to the gamma.

FIGS. 3A~3D illustrate first to fourth preferred color selection screens, respectively.

A method for adjusting a preferred color in accordance with a preferred embodiment of the present invention will be described in more detail with reference to FIGS. 2 to 3D.

Referring to FIG. 2, when a user buys an image display device, and intends to use at the first time or adjust colors, such as the preferred colors, the user starts the ST1 step. In the ST1 step, a menu selection image is displayed. In this instance, the user can input various options, such as date, scheduled turn on/off, the present time, and so on by using a selection key on the image display device or a remote controller. If the user intends to set the preferred colors and the like, the user is required to go to the preferred color selection step (ST2~ST4).

Figure 3A:
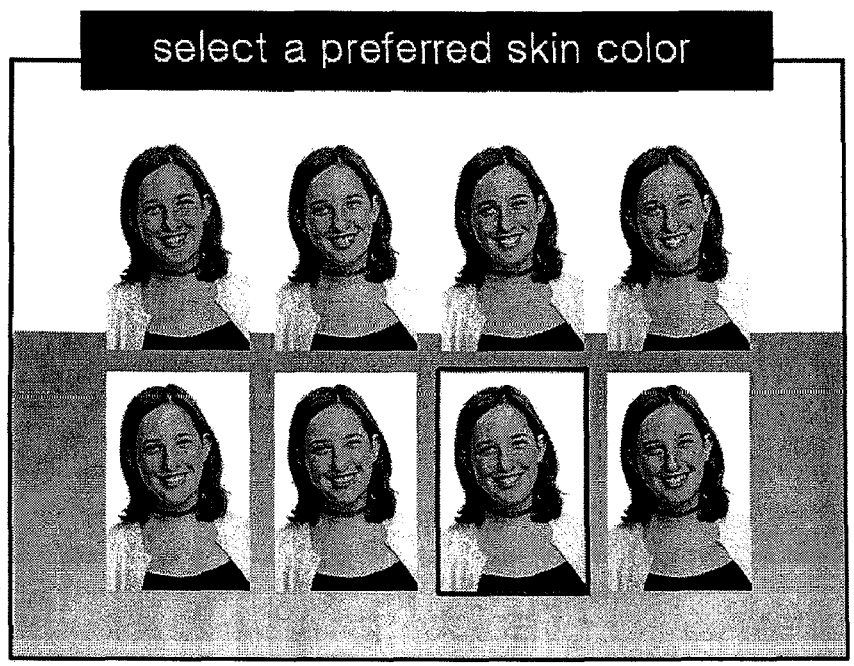
FIGS. 3A~3D illustrate first to fourth preferred color selection screens, respectively.

In the preferred color selection step (ST2~ST4), a first preferred color selection image is displayed on the image display device (ST2) as shown in FIG. 3A. The first preferred color selection image can be a skin color, for an example, a face color, selection image. That is, the first preferred color selection image can be an image showing a plurality of face color selection images having brightness and color saturation set different from one another in a similar colors so that the user selects preferred one of the face colors. In this instance, the color having brightness and color saturation set different from one another in similar colors can be a color having a chromaticity or a color temperature set different from one another in the similar colors. Along with this, the plurality of selection images can be identical images of the same person having brightness and color saturation set different from one another in similar colors for expressing differences of the face colors, well. The brightness and color saturation of the similar colors can be applied to respective selection images in many steps, starting from a case the brightness and color saturation of the similar colors are applied to the selection image at the lowest to a case the brightness and color saturation of the similar colors are applied to the selection image at the highest. As shown in FIG. 3A, if 8 selection images are used, 8 cases of similar colors and brightness and color saturation most frequently applied to general image display devices may be selected as the selection image. Thus, if a plurality of selection images are displayed on the selection image, the user sets a preferred selection image by using the selection key on the image display device, the remote controller, or the like. Then, information on the color, the brightness and the color saturation of the selection image set thus, i.e., information on the preferred color is stored in a preferred color adjusting device.

Figure 3B:
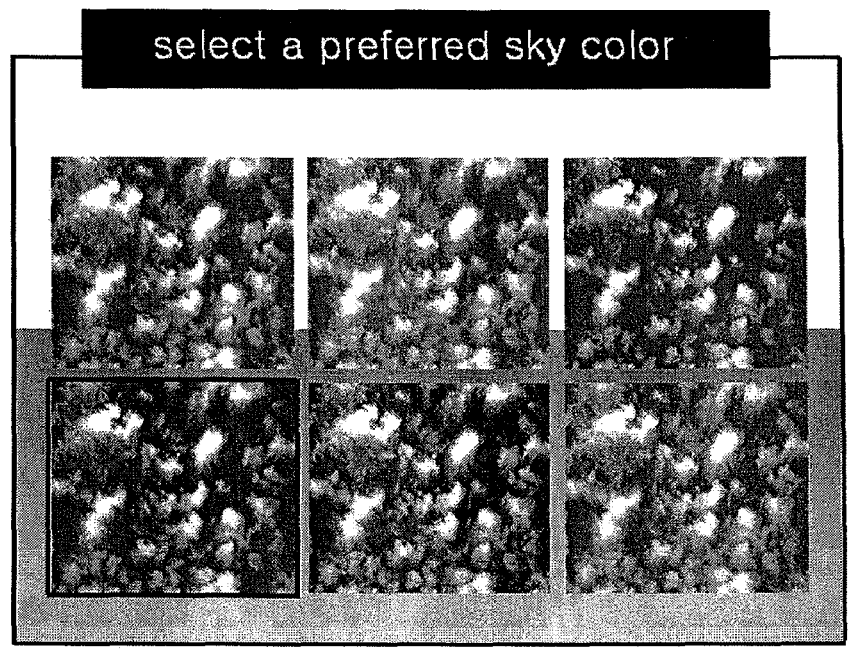

Once the first preferred color is set, as shown in FIG. 3B, a second preferred color selection image may be displayed on the image display device (ST3). The second preferred color selection image can be a preferred blue, i.e., a sky color, selection image. That is, the second preferred color selection image can be an image showing a plurality of sky color selection images having brightness and color saturation set different from one another in a similar colors so that the user selects preferred one of the sky colors. The plurality of selection images can be identical images with sky backgrounds having brightness and color saturation set different from one another in similar colors for expressing differences of the sky colors, well. The color, brightness, and color saturation can be applied to respective selection images in many steps, starting from a case the color, brightness, and color saturation are applied to the selection image at the lowest to a case the color, brightness and color saturation are applied to the selection image at the highest. As shown in FIG. 3B, if 6 selection images are used, 6 cases of similar colors and brightness and color saturation most frequently applied to general image display devices may be selected as the selection image. Thus, if a plurality of selection images are displayed on the selection image, the user sets a preferred selection image by using the selection key on the image display device, the remote controller, or the like. Then, information on the color, the brightness and the color saturation of the selection image set, i.e., information on the preferred color is stored in a preferred color adjusting device.

Figure 3C:

Once the second preferred color is set thus, as shown in FIG. 3C, a third preferred color selection image may be displayed on the image display device (ST4). The third preferred color selection image may be a preferred green color, for an example, a grass color, selection image. That is, the third preferred color selection image can be an image showing a plurality of grass color selection images having brightness and color saturation set different from one another in a similar colors so that the user selects preferred one of the grass colors. The plurality of selection images can be identical images with grass backgrounds having brightness and color saturation set different from one another in similar colors for expressing differences of the grass colors, well. The color, brightness, and color saturation can be applied to respective selection images in many steps, starting from a case the color, brightness, and color saturation are applied to the selection image at the lowest to a case the color, brightness and color saturation are applied to the selection image at the highest. As shown in FIG. 3C, if 6 selection images are used, 6 cases of similar colors and brightness and color saturation most frequently applied to general image display devices may be selected as the selection image. Thus, if a plurality of selection images are displayed on the selection image, the user sets a preferred selection image by using the selection key on the image display device, the remote controller, or the like. Then, information on the color, the brightness and the color saturation of the selection image set, i.e., information on the preferred color is stored in a preferred color adjusting device.

Figure 3D:
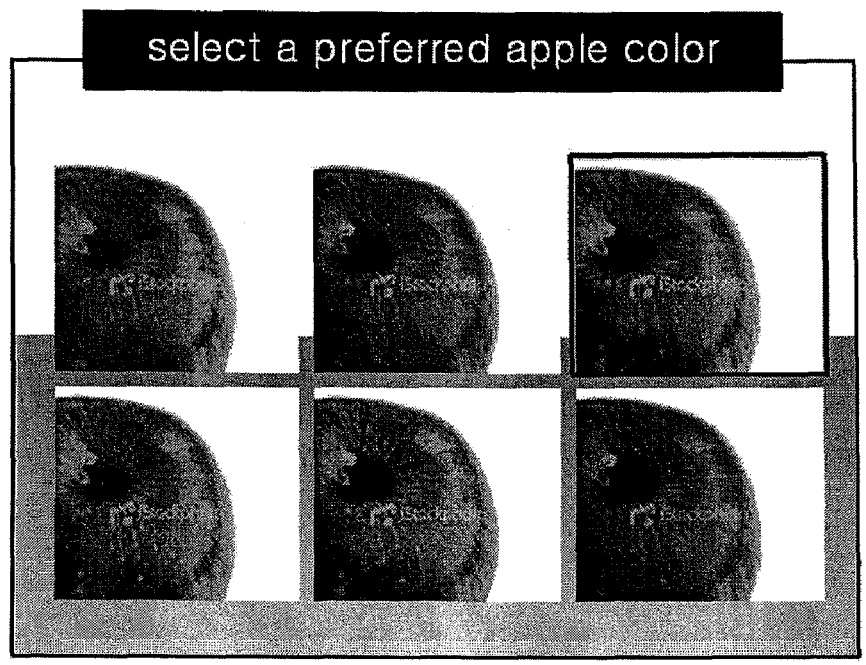

Though not shown in FIG. 2, in the preferred color selection step, a fourth preferred color selection image shown in FIG. 3D may be displayed after the third preferred color is set. In this instance, the fourth preferred color selection image may be a preferred red color, for an example, an apple color selection image. That is, the fourth preferred color selection image can be an image showing a plurality of apple color selection images having brightness and color saturation set different from one another in a similar colors so that the user selects preferred one of the apple colors. In this instance, the color having brightness and color saturation set different from one another in similar colors can be a color having a chromaticity or a color temperature set different from one another in the similar colors. The plurality of selection images can be identical images of an apple having brightness and color saturation set different from one another in similar colors for expressing differences of the apple colors, well. The color, brightness, and color saturation can be applied to respective selection images in many steps, starting from a case the color, brightness, and color saturation are applied to the selection image at the lowest to a case the color, brightness and color saturation are applied to the selection image at the highest. As shown in FIG. 3D, if 6 selection images are used, 6 cases of similar colors and brightness and color saturation most frequently applied to general image display devices may be selected as the selection image. Thus, if a plurality of selection images are displayed on the selection image, the user sets a preferred selection image by using the selection key on the image display device, the remote controller, or the like. Then, information on the color, the brightness and the color saturation of the selection image set, i.e., information on the preferred color is stored in a preferred color adjusting device.

As described before, in the preferred color selection step (ST2~ST3), at least one preferred color selection image is displayed in succession. Information on preferred colors displayed each of at least one preferred color selection image enables the user to select preferred color conveniently by using a plurality of selection images. Along with this, a plurality of selection images showing general things, and/or natural backgrounds may be added so that preferred colors on natural colors, such as a sunset color, and a brown color can be set in addition to the preferred colors on the skin color, the blue color, the green color, and the red color.

Figure 4A:
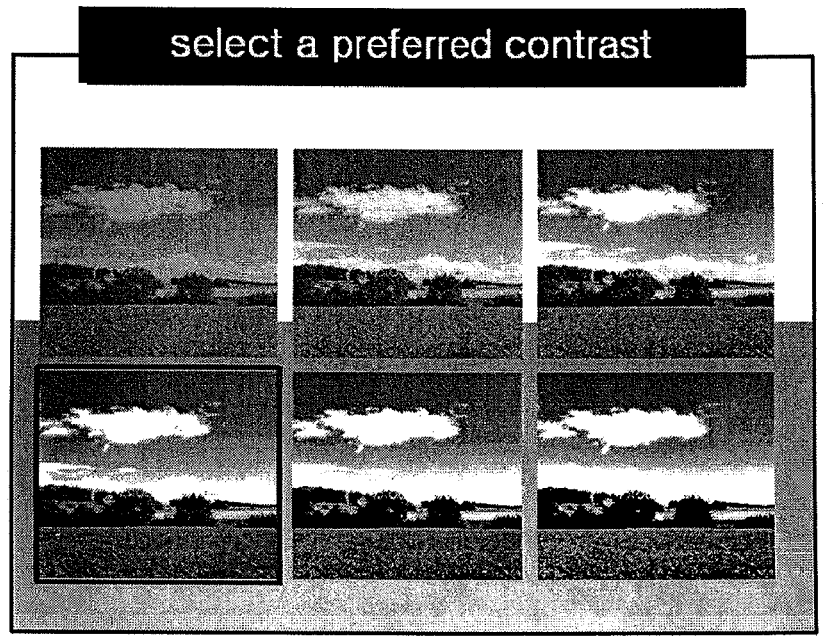
FIGS. 4A and 4B illustrate preferred contrast and gamma selection screens, respectively.
Figure 4B:
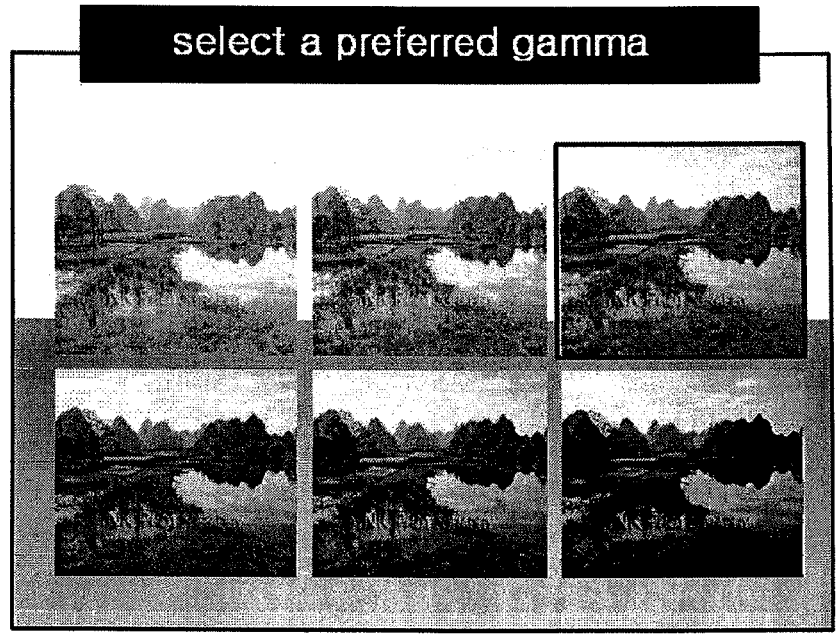

FIGS. 4A and 4B illustrate preferred contrast and gamma selection screens, respectively.

If the information on preferred colors is set in the preferred color selection step, a contrast selection image shown in FIG. 4A is displayed on the image display device (ST5). In this instance, the contrast selection image may be a selection image of natural background for setting preferred contrasts on brightness and color saturation. That is, the contrast selection image can be an image showing a plurality of natural background selection images having contrasts set different from one another in similar colors so that the user selects preferred one of the contrasts. The plurality of selection images can be identical images of a natural background having contrasts set different from one another in similar colors for expressing differences of the contrasts, well. The contrasts can be applied to respective selection images in many steps, starting from a case the contrasts are applied to the selection image at the lowest to a case the contrasts are applied to the selection image at the highest. As shown in FIG. 4A, if 6 selection images are used, 6 cases of contrasts most frequently applied to general image display devices may be selected as the selection image. Thus, if a plurality of contrast selection images are displayed on the selection image, the user sets a preferred contrast selection image by using the selection key on the image display device, the remote controller, or the like. Then, information on the contrast of the selection image set thus is stored in a preferred color adjusting device as information on preferred color.

If the information on contrasts is set in the ST5 step, a gamma selection image shown in FIG. 4B is displayed on the image display device (ST6). In this instance, the gamma selection image may be a selection image of natural background for setting preferred brightness or picture quality of an image. That is, the gamma selection image can be an image showing a plurality of natural background selection images having brightness or picture quality set different from one another in similar colors so that the user selects preferred one of the brightness or the picture quality. The plurality of gamma selection images can be identical images of a natural background having gamma set values (for an example, graphs which define gamma characteristics) set different from one another in similar colors for expressing differences of the brightness or the picture quality of the similar colors, well. The brightness or the picture quality can be applied to respective gamma selection images in many steps, starting from a case the brightness or the picture quality is applied to the selection image at the lowest to a case the brightness or the picture quality is applied to the selection image at the highest. As shown in FIG. 4B, if 6 selection images are used, 6 cases of gamma values most frequently applied to general image display devices may be selected as the selection image. Thus, if a plurality of gamma selection images are displayed on the selection image, the user sets a preferred gamma selection image by using the selection key on the image display device, the remote controller, or the like. Then, information on the gamma value of the selection image set thus is stored in a preferred color adjusting device as information on preferred color.

Once at least one preferred color information, contrast information, and gamma information are set in the preferred color selection steps ST1~ST6 as described before, the user stores the information on the preferred colors (ST7) by using the selection key on the image display device, or the remote controller, or the like, and turn off the menu selection image. Then, the preferred color adjusting device adjusts images received from an outside of the device by using the information on the preferred colors stored thus, i.e., the first to fourth preferred color information, the contrast information, and the gamma information, and displays images adjusted thus as adjusted images.

Figure 5:
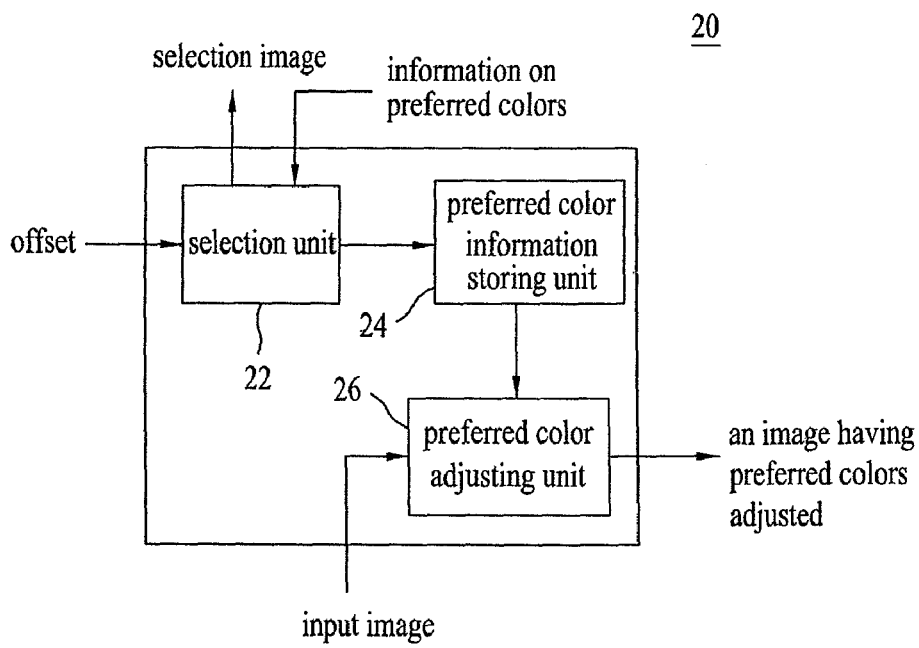
FIG. 5 illustrates a block diagram of a device for adjusting a preferred color in accordance with a preferred embodiment of the present invention.

FIG. 5 illustrates a block diagram of a device for adjusting a preferred color in accordance with a preferred embodiment of the present invention.

Referring to FIG. 5, the preferred color adjusting device includes a selection unit 22 for displaying a plurality of preferred color selection images in succession each having a plurality of selection images with preferred color information different from one another upon reception of an offset signal and displaying preferred color information the user set in succession; a preferred color information storing unit 24 for storing the preferred color information received from the selection unit 22 in succession, and a preferred color adjusting unit 26 for adjusting images received from an outside of the device in succession according to information on the preferred colors stored in the preferred color information storing unit 24 to display images having the preferred colors thereof adjusted respectively.

The selection unit 22 displays a menu selection image, at least one preferred color selection image, and a gamma selection image on the image display device in succession according to the offset signal received from the user. The user may input the offset signal when the image display device is used for the first time or the user intends to adjust colors of the preferred colors.

Thus, if the offset signal is received, the selection unit 22 displays the menu selection image at first, and, if the user intends to set the preferred color, displays at least one preferred color selection image on the image display device in succession. In this instance, the at least one selection image is an image which enables the user to select at least one preferred color in succession. For an example, the first preferred color selection image may be an image showing a plurality of face color selection images having brightness or color saturation set different from one another in similar colors so that the user selects one preferred skin color, for an example, a face color. The second preferred color selection image may be an image showing a plurality of sky color selection images having brightness or color saturation set different from one another in similar colors so that the user selects one preferred blue colors, for an example, sky color. The third preferred color selection image may be an image showing a plurality of grass color selection images having brightness or color saturation set different from one another in similar colors so that the user selects one preferred green colors, for an example, grass color. The fourth preferred color selection image may be an image showing a plurality of apple color selection images having brightness or color saturation set different from one another in similar colors so that the user selects one preferred red colors, for an example, apple color. Thus, the selection unit 22 displays preferred color selection images, such as a sunset color, or a brown color, in addition to the first to fourth preferred color selection images in succession, and along with this, if the user sets the preferred color information in succession, supplies the preferred color information set thus to the preferred color information storing unit 24 in succession.

If the user intends to set the contrast, the selection unit 22 displays the contrast selection image on the image display device. In this instance, the contrast selection image may be a selection image of natural background for setting preferred contrasts on brightness and color saturation. That is, the contrast selection image can be an image showing a plurality of natural background selection images having contrasts set different from one another in similar colors so that the user selects preferred one of the contrasts. Thus, the selection unit 22 displays the contrast selection image on the image display device, and, if the user sets preferred contrast information, supplies the preferred contrast information to the preferred color information storing unit 24 as one of preferred color information.

If the user intends to set the preferred gamma information, the selection unit 22 displays the gamma selection image on the image display device. In this instance, the gamma selection image may be a selection image of natural background for setting preferred brightness or picture quality of the image. That is, the gamma selection image can be an image showing a plurality of natural background selection images having brightness or picture quality set different from one another so that the user selects preferred one of the brightness or picture quality. Thus, the selection unit 22 displays the gamma selection image on the image display device, and, if the user sets preferred gamma information, supplies the preferred gamma information to the preferred color information storing unit 24 as one of preferred color information.

The preferred color storing unit 24 has at least one memory for storing information on preferred colors received from the selection unit 22 in succession, for an example, the first to fourth preferred color information, the contrast information, and the gamma information. Also, the preferred color storing unit 24 supplies the at least one preferred color information, the contrast information, and the gamma information stored thus to the preferred color adjusting unit 26 in real time.

The preferred color adjusting unit 26 adjusts at least one of a gray scale and a brightness of the image received from an outside of the device according to information on at least one preferred color received from the preferred color storing unit 24. The preferred color adjusting unit 26 also generates a gamma adjusting signal according to preferred gamma information from the preferred color information storing unit 24 and supplies to a power unit or a gamma voltage generating unit in the image display device. In more detail, the preferred color adjusting unit 26 compares the at least one preferred color information to images received in horizontal line unit or frame unit and detects similar colors from the received images. Then, the preferred color adjusting unit 26 adjusts at least one of a gray scale or brightness of the similar colors detected thus according to the preferred color information, and forwards as an image having a preferred color thereof adjusted. Along with this, the preferred color adjusting unit 26 also generates gamma adjusting signal according to the gamma information and supplies to the power unit or the gamma voltage generating unit in the image display device, when the power unit or the gamma voltage generating unit changes a resistance value, input/output voltage values, and the like according to the gamma adjusting signal and generates a gamma voltage having gamma characteristics changed. That is, by displaying an image according to the image having the preferred color adjusted from the preferred color adjusting device and the gamma voltage having the gamma characteristics adjusted from the gamma voltage generating unit, the image display device can improve satisfaction of the users.

Figure 6:
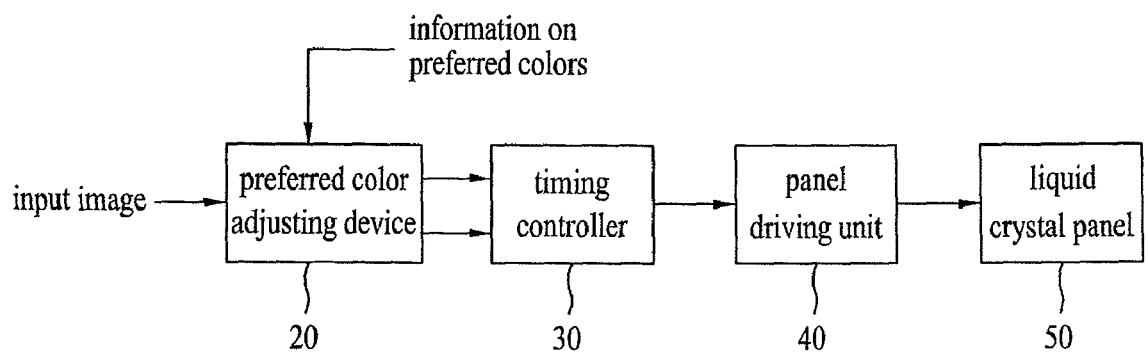
FIG. 6 illustrates a block diagram of a liquid crystal display device having the preferred color adjusting device applied thereto, schematically.

FIG. 6 illustrates a block diagram of a liquid crystal display device having the preferred color adjusting device of the present invention applied thereto, schematically.

Referring to FIG. 6, the liquid crystal display device includes a liquid crystal display panel 50 having a plurality of pixels for displaying an image, a panel driving unit 40 for driving the liquid crystal display panel 50, a preferred color adjusting device 20 for making successive display of a plurality of preferred color selection images each having a plurality of selection images with information on preferred colors different from one another and generating a preferred color adjusting image according to preferred color information the user set, and a timing controller 30 for aligning the preferred color adjusting image suitable for driving of the liquid crystal display panel 50, and controlling the panel driving unit 40.

The liquid crystal display panel 50 includes a thin film transistor formed on each of the pixels defined by a plurality of gate lines and a plurality of data lines, and a liquid crystal capacitor connected to each of the thin film transistor. The liquid crystal capacitor includes a pixel electrode connected to the thin film transistor, and a common electrode opposite to the pixel electrode with the liquid crystals inbetween. The thin film transistor supplies an image signal from the data line to the pixel electrode in response to a scan pulse from the gate line. The liquid crystal capacitor has a difference voltage between the image signal supplied to the pixel electrode and the common voltage supplied to the common electrode charged thereto, and varies an orientation of liquid crystal molecules to adjust a light transmissivity to realize a gray scale. The liquid crystal capacitor has a storage capacitor connected in parallel for maintaining the voltage charged at the liquid crystal capacitor until the next data signal is supplied. The storage capacitor overlaps with the pixel electrode with a prior gate line and an insulation film arranged between the storage capacitor and the pixel electrode. Different from this, the storage capacitor overlaps with the pixel electrode with a storage line and an insulation film arranged between the storage capacitor and the pixel electrode.

The panel driving unit 40 includes a data driving unit for driving a plurality of data lines and a gate driving unit for driving a plurality of gate lines.

The data driving unit converts aligned preferred color adjusting image from the timing controller 30 into an analog image signal by using data control signals from the timing controller 30, such as a source start pulse signal, a source shift clock signal, a source output enable signal, and so on. The data driving unit also supplies the analog image signal of one horizontal line portion to each data line in every horizontal period in which the scan pulse is supplied to each of the gate line.

The gate driving unit generates scan pulses in succession in response to gate control signals from the timing controller 30, for an example, a gate start pulse signal, and a gate shift clock signal, and controls a width of the pulse of the scan pulse according to the gate output enable signal. The gate driving unit also supplies the scan pulses having widths thereof limited, i.e., gate on voltages, to the gate lines in succession, and supplies a gate off voltage to the gate lines in a period no gate on voltage is supplied.

The preferred color adjusting device 20 displays a plurality of preferred color selection images each having a plurality of selection images with information on preferred colors different from one another on the liquid crystal display panel 50 in succession for generating preferred color adjusting images according to preferred color information set by the user. As shown in FIG. 5, the preferred color adjusting device 20 includes a selection unit 22 for displaying a plurality of preferred color selection images in succession each having a plurality of selection images with preferred color information different from one another upon reception of an offset signal and displaying preferred color information the user set in succession; a preferred color information storing unit 24 for storing the preferred color information received from the selection unit 22 in succession, and a preferred color adjusting unit 26 for adjusting images received from an outside of the device in succession according to information on the preferred colors stored in the preferred color information storing unit 24 to display images having the preferred colors thereof adjusted respectively. Detailed description of the preferred color adjusting device 20 will be omitted since the same is made before with reference to FIG. 5.

The timing controller 30 aligns the preferred color adjusting images from the preferred color adjusting device 20 suitable for driving of the liquid crystal display panel 50, and supplies to the data driving unit. Also, the timing controller 30 generates gate control signals and data control signals by using a synchronizing signal received from an outside of the device for controlling the data driving unit and the gate driving unit.

Since the liquid crystal display device of the present invention can display images adjusted with preferred color information set by the user conveniently, the liquid crystal display device can display images with a picture quality the user satisfies.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As has been described, the method and device for adjusting a preferred color and a liquid crystal display device with the same of the present invention have the following advantages.

The user can set preferred colors with a variety of selection images displayed on a screen, conveniently. Along with this, since the user can display image by using information on preferred colors the user set conveniently, user's picture quality satisfaction can be improved.

What is claimed is:

1. A method for adjusting a preferred color comprising:
    displaying a menu selection image and setting a variety of optional information on the display panel;
    making successive display of at least one selection image which shows a plurality of selection images having information on preferred colors different from one another to set information on the preferred colors in succession using a selection unit; and
    storing the information on the preferred colors set and generating an image having preferred colors adjusted according to the information on the preferred colors stored using a preferred color adjusting unit,
    wherein the at least one selection image is an image showing a plurality of selection images having brightness or color saturation set different from one another in similar colors so that one of preferred colors can be selected from each of a skin color, a red color, a green color, a blue color, a sunset color, and a brown color.

2. The method as claimed in claim 1, wherein a color having the brightness or the color saturation set different from one another in similar colors is a color having a chromaticity or a color temperature set different from one another in the similar colors.

3. The method as claimed in claim 2, wherein making successive display of at least one selection image includes; displaying a contrast selection image to set preferred color information on the contrast, and displaying a gamma selection image and setting preferred color information on a gamma value.

4. The method as claimed in claim 3, wherein the contrast selection image is an image showing a plurality of selection images having contrasts set different from one another, and
    the gamma selection image is an image showing a plurality of selection images having information on gammas set different from one another.

5. A device for adjusting a preferred color comprising:
    a preferred color information storing unit that stores information on preferred colors; and
    a preferred color adjusting unit that adjusts images received from an outside of the device in succession according to the information on preferred colors stored to forward images each having preferred colors adjusted,
    wherein the at least one selection image is an image showing a plurality of selection images having brightness or color saturation set different from one another in similar colors so that one of preferred colors can be selected from each of a skin color, a red color, a green color, a blue color, a sunset color, and a brown color.

6. The device as claimed in claim 5, wherein the at least one selection image further includes;
    an image showing a plurality of selection images having contrasts set different from one another, and an image showing a plurality of selection images having information on gammas set different from one another.

7. The device as claimed in claim 6, wherein the preferred color adjusting unit adjusts at least one of gray scales and brightness of images received from an outside of the device according to information on preferred colors for generating images having preferred colors adjusted, and generates and forwards a gamma adjusting signal.

8. A liquid crystal display device comprising:
a liquid crystal display panel having a plurality of pixels to display an image;
a panel driving unit that drives the liquid crystal display panel;
a preferred color adjusting device that generates an image having preferred colors adjusted according to preferred color information the user sets, the preferred color adjusting device including a preferred color information storing unit that stores information on preferred colors, and a preferred color adjusting unit that adjusts images received from an outside of the device in succession according to the information on preferred colors stored to forward images each having preferred colors adjusted; and
a timing controller that aligns images each having preferred colors adjusted suitable to drive the liquid crystal display panel, and controls the panel driving unit,
wherein the at least one selection image is an image showing a plurality of selection images having brightness or color saturation set different from one another in similar colors so that one of preferred colors can be selected from each of a skin color, a red color, a green color, a blue color, a sunset color, and a brown color.

9. The liquid crystal display device as claimed in claim 8, wherein the at least one selection image further includes;
an image showing a plurality of selection images having contrasts set different from one another, and
an image showing a plurality of selection images having information on gammas set different from one another.

10. The liquid crystal display device as claimed in claim 9, wherein the preferred color adjusting unit adjusts at least one of gray scales and brightness of images received from an outside of the device according to information on preferred colors for generating images having preferred colors adjusted, and generates and forwards a gamma adjusting signal.

* * * * *